United States Patent [19]

Wong et al.

[11] Patent Number: 5,345,254
[45] Date of Patent: Sep. 6, 1994

[54] INK JET PRINTING PROCESS

[75] Inventors: Raymond W. Wong; Marcel P. Breton, both of Mississauga; Melvin D. Croucher, Oakville; James M. Duff, Mississauga; T. Edward Petroff, Agincourt; William Riske, Burlington; Kerstin M. Henseleit, Toronto, all of Canada

[73] Assignee: Xerox Corporation, Stamford, Conn.

[21] Appl. No.: 700,969

[22] Filed: May 16, 1991

[51] Int. Cl.$^5$ .................................................. G01D 9/00
[52] U.S. Cl. ...................................... 347/100; 106/20 D
[58] Field of Search ............... 346/1.1; 106/20, 22, 106/23, 31, 20 D, 29 A, 31 R; 430/115

[56] References Cited

U.S. PATENT DOCUMENTS

| | | | |
|---|---|---|---|
| 3,353,974 | 11/1967 | Trimble et al. | 106/31 |
| 3,406,137 | 10/1968 | Terry et al. | 260/28.5 |
| 4,075,143 | 2/1978 | Schelhaas et al. | 106/30 X |
| 4,218,252 | 8/1980 | Yokoyama | 106/31 |
| 4,390,369 | 6/1983 | Merritt et al. | 106/31 |
| 4,484,948 | 11/1984 | Merritt et al. | 106/31 |
| 4,533,254 | 8/1985 | Cook et al. | 366/176 |
| 4,565,576 | 1/1986 | Saltó et al. | 106/23 |
| 4,612,052 | 9/1986 | Schwartz | 106/31 |
| 4,636,258 | 1/1987 | Hayashi et al. | 106/31 |
| 4,684,956 | 8/1987 | Ball | 346/1.1 |
| 4,692,188 | 9/1987 | Ober et al. | 106/23 |
| 4,704,163 | 11/1987 | Baratto et al. | 106/20 |
| 4,724,002 | 2/1988 | Shibata et al. | 106/31 |
| 4,762,734 | 8/1988 | Duff et al. | 427/146 |
| 4,822,710 | 4/1989 | Croucher et al. | 430/115 |
| 4,834,799 | 5/1989 | Song | 106/22 |
| 4,846,887 | 7/1989 | Kuehnle | 106/31 R |
| 4,878,946 | 11/1989 | Tabayashi et al. | 106/27 |
| 5,000,092 | 3/1991 | Best | 106/31 X |
| 5,047,084 | 9/1991 | Miller et al. | 106/22 X |

Primary Examiner—Benjamin R. Fuller
Assistant Examiner—Alrick Bobb
Attorney, Agent, or Firm—Oliff & Berridge

[57] ABSTRACT

An ink jet printing process includes jetting an ink composition onto a substrate. The ink composition is an emulsion or suspension of an organic phase in a water phase, the organic phase including at least one of oil and wax.

18 Claims, No Drawings

INK JET PRINTING PROCESS

FIELD OF THE INVENTION

This invention relates to ink jet printing, and more particularly, to ink compositions for ink jet printers.

BACKGROUND

Ink compositions, especially those for use with ink jet printers, must satisfy a number of conditions in order to achieve acceptable printing.

The ink composition should possess properties which permit it to be jetted appropriately from an ink jet printer. In ink jet printing, droplets of ink are expelled from nozzles onto a recording medium. The ink should form a meniscus at each nozzle prior to being expelled in the form of a droplet. After a droplet is expelled, additional ink surges to the nozzle to reform the meniscus. Important properties of the ink in this context include viscosity and surface tension.

To achieve acceptable jetting properties, most inks are water based. Generally, highly water soluble dyes are used to avoid problems such as kogation. Kogation refers to the formation of a solid deposit on the surface of the thermal ink printhead heater surface. As a result, the inks tend to suffer from a number of other problems. In particular, poor water fastness results from utilizing highly water soluble dyes. Upon wetting, the ink can easily be redissolved from the paper after printing.

Attempts have been made to improve water fastness by the addition of various additives and surfactants. However, these materials can adversely affect print quality and/or jetting characteristics.

Shibata et al U.S. Pat. No. 4,724,002 discloses heat-sensitive transfer media containing an ink composition comprising a binder and a pigment. The binder may be a wax and the pigment may be an oil-based pigment or dry color which is suspended within the binder to impart a color to the ink. A process for preparing a solid heat-sensitive transfer medium is disclosed as including (1) providing a mixture of pigment and water; (2) adding the mixture of pigment and water to a molten solid wax binder; (3) mixing the molten wax binder and the mixture of pigment and water, in order to remove the water from the pigment and disperse the pigment as particulates into the molten wax binder; (4) separating the water from the molten wax binder with the pigment particulates; (5) blending additives with the molten wax binder with the pigment particulates to form a molten heat-sensitive transfer medium; and (6) cooling the molten heat-sensitive transfer medium.

Terry et al U.S. Pat. No. 3,406,137 discloses a pressure transfer ink formulation comprising a pigment dispersed in a binder. The binder is comprised of waxes, wax soluble dyes, an adhesive resin and polysiloxane.

Duff et al U.S. Pat. No. 4,762,734 discloses an ink donor film comprising in a hydrocarbon solution of wax components and/or polymer components, or a mixture of wax and polymer components, dispersed in a polar phase containing dispersed pigment or dissolved dye. The coloring agent may include a dye and/or pigment wherein the dye is an alcohol or hydrocarbon-soluble dye. An emulsion process for preparing thermal ink donor films is comprised of: (1) adding wax and/or polymer components to a hydrocarbon solution; (2) adding additives which are soluble in the solution; (3) forming an emulsion by adding to the solution a polar liquid containing a pigment and optional additives; (4) grinding the resulting emulsion; (5) coating the emulsion; and (6) heating the resulting emulsion which has been coated.

Merritt et al U.S. Pat. Nos. 4,390,369 and 4,484,948 disclose a natural-wax ink jet ink containing at least one natural wax. The wax may be used as a basic fluid vehicle or as an additive to other fluid vehicles. A coloring agent or dye such as an oil or solvent dye may be added to the composition.

Hayashi et al U.S. Pat. No. 4,636,258 discloses an ink composition comprising a copolymer, a colorant dispersed therein, and wax or resin. The wax may be added to the colorant when dispersed in the copolymer.

Tabayashi et al U.S. Pat. No. 4,878,946 discloses a hot melt ink for thermal ink-jet printers which comprises an oil-soluble dye and additives dissolved in at least one compound that is solid at ambient temperature.

Trimble et al U.S. Pat. No. 3,353,974 discloses a homogeneous composition for printing inks and various coatings comprising an oil, wax and/or resinous base, and a high concentration of dispersed pigments.

There is a need for ink compositions for ink jet printers which not only provide acceptable jetting properties, but which provide good print quality and water fastness when printed.

SUMMARY OF THE INVENTION

It is an object of the invention to provide improved ink jet processes which overcome the disadvantages of the prior art.

It is also an object of the invention to provide ink jet processes which provide good print quality and good image water fastness and rub resistance.

It is yet another object of the invention to provide improved ink jet compositions.

These and other objects of the invention are provided by jetting an ink composition comprising an emulsion of an organic phase in a water phase, the organic phase including at least one of oil and wax. The ink compositions preferably contain a pigment or dye, in either or both phases. In the printing process of the invention, heat may be applied to melt any wax present on a printed image to enhance the advantageous properties of the invention.

DETAILED DESCRIPTION OF PREFERRED EMBODIMENTS

The ink compositions of the present invention are emulsions of an organic phase in a water phase, the organic phase including at least one of an oil and waxy. In one preferred embodiment, the organic phase contains a colorant which may be a pigment or oil soluble dye, and at least one of oil and wax. In another preferred embodiment, the colorant is contained in the water phase. The composition and processes of the invention permit the formation of images with improved water fastness, print quality, and rub resistance, while minimizing show through.

The organic phase of the ink compositions of the present invention may make up about 5% to about 50% by weight of the total composition, preferably about 10% to about 20% by weight of the total composition.

If oil is present in the organic phase of the ink compositions of the present invention, it may be present in an amount ranging from about 5% to about 50% by weight, preferably from about 10% to about 20% by weight when no wax is contained in the composition. If wax is present, then the amount of oil may range from about 0% to about 50% by weight, preferably from about 5% to about 25% by weight based on weight of the total composition. The oil may be any suitable oil having a viscosity ranging from about 2 to about 150 cP and preferably has a viscosity ranging from about 5 to about 150 cP, more preferably from about 10 to about 50 cP, at 40° C. Magiesol 60 (Magie Brothers) is particularly preferred.

The oil may be colored with an oil soluble dye, pigment or mixture thereof. Suitable oil soluble dyes include, for example, BASF Sudan Blue 670, BASF Basacid Red, Oil Blue N (Aldrich), and BASF Neptune Blank dye. The pigment may include, for example, Columbian Raven 5250 carbon black, Paul Uhlich 8200 carbon black, American Hoechst PV Fast Blue and American Hoechst Novaperm yellow.

Wax may be provided in an amount ranging from about 0.5 to about 50% by weight, preferably from about 1 to about 20% by weight, when no oil is contained in the composition. If oil is present, the amount of wax may range from about 0.5% to about 50% by weight, preferably from about 1% to about 10% by weight, based on weight of the total composition. The wax may be liquid wax or particulate wax. Particulate wax preferably is a low melt wax, and is meant to refer to wax in the form of solid particles. Low melt wax is meant to refer to waxes which melt at relatively low temperatures, for example, waxes which melt at 150° or less, preferably between about 40° C.–150° C. or less and more preferably at about 100° C. or less. Liquid wax is meant to refer to waxes which are liquid at room temperature. The wax may be dyed with a colorant such as an oil soluble dye and/or pigment as described above. Alternatively, the wax may be dissolved in the oil and/or dyed with a pigment, oil soluble dye or mixture thereof.

Waxes which may be used in the present invention include Refined Karagami wax from Concord, Concord Premium Wax SE microemulsion, Diamond Shamrock Chlorowax 40 liquid chlorinated paraffin, polyethylene waxes from Hoechst, for example, type PE-130, PE-190 and Ceridust 3620; beeswax (NF grade, m.p.: 62°–65° C.; Japan Wax NJ-2 (Natural wax, m.p.=48°–54° C.) from Astor Wax Corporation; Concord waxes, for example, Concord SE Premium wax (self emulsified, m.p. 85.5° C.), Refined Concord Wax #407 (m.p. 86° C.), #159 (m.p. 84° C.), #190 (m.p. 90° C.), #1600 (m.p. 84.5° C.), Concord Cowax (m.p. 84° C.), and specialty waxes such as Concord microcrystalline wax #100 (m.p. 86° C.), Concord Wax WS-1027 (m.p. 61° C.), Concord Wax #5000 (m.p. 101.5° C.) and Concord Beeswax Substitute (m.p. 79.5° C.). Other suitable waxes include Refined Montan Wax (drop point (d.p.) 82°–88° C.); acid waxes with a drop point of 81°–87° C. such as Hoechst Wachs LP, UL and FW; ester waxes such as Hoechst Wachs E (d.p. 79°–85° C.) , X-22 (d.p. 78°–86° C.), F (d.p. 77°–83° C.), KP (d.p. 81°–87° C.) , KP 302 (d.p. 86°–92° C.) , KPF (d.p. 80°–85° C.), KSL (d.p. 80°–85° C.), KSS (d.p. 82°–88° C.) , KFO (d.p. 85°–91° C.) and KFT (d.p. 55°–62° C.); ester waxes containing emulsifier such as Hoechst Wachs KPE (d.p. 79°–85° C.) , KSE (d.p. 82°–88° C.), KLE (d.p. 82°–88° C.) and DPEneu (d.p. 79°–85° C.); polar and nonpolar polyethylene wax (m.p. about 110°–130° C.); and other similar waxes.

Waxes may clog the nozzles of an ink jet in some of the compositions of the invention. One method of preventing clogging is to heat the nozzles. Clogging can also be prevented by plasticizing the wax. Suitable plasticizers include, for example, refined linseed oil, Magie-Sol 52, MagieSol 60 and MagieSol 62 from Magie Bros. Oil Co., Telura light process oils from Exxon with viscosities ranging from about 2.8 to about 22 cSt at 40° C., Gulf paraflex oils with viscosities lower than about 150 cSt at 40° C., and Shellflex paraffinic oils from Shell with pour point of $-12°$ C. or less. It is noted that heating and/or plasticizing are not required with all of the embodiments of the invention.

The wax particles of the invention can be provided by way of a microemulsion. The wax particles may have a particle diameter ranging from about 0.01 micrometer to about 2.0 micrometers, and more preferably have a particle diameter ranging from about 0.1 micrometer to about 0.5 micrometer.

The emulsified oil may have a diameter of about 0.01 micrometer to about 1 micrometer, more preferably about 0.1 micrometer to about 0.5 micrometer.

The organic phase of the ink compositions of the present invention may also contain an oil soluble resin which is dissolved in oil. The resin permits an increase in the print quality of printed images. The resin may be present in the organic phase in an amount ranging from about 1 to about 50, more preferably from about 1.0 to about 20, weight percent. Preferably, the oil soluble resin is added to a low viscosity oil having a viscosity ranging from about 1 cps to about 200 cps at 40° C. The oil may be colored as described above with an oil soluble dye, a pigment, or a mixture thereof.

The resin may be any oil soluble resin, preferably one having a melting temperature of about 100° C. or less. Examples of resins which may be utilized include, for example, polyhalogenated polyolefins such as Eastman Kodak CP 343-1 chlorinated polyolefin (m.p. 80°–95° C.), CP 343-3 (m.p. 65°–71° C.), CP 153-2 and CP 515-2. Other appropriate resins include rosin modified maleic resins, aliphatic hydrocarbon resins, poly alpha-alkyl styrenes with a molecular weight of 600–1000, Eastman Eastotac TM resin H-100 (softening point (s.p.) 100° C.), H-115 (s.p. 115° C.), H-130 (s.p. 130° C.), and H-142 (s.p. 142° C.), and Unires resin (Union Camp Corp.) (s.p. 95°–150° C.). Polymeric additives can also be added to inks to enhance their viscosity. Such additives include water soluble polymers such as gum arabic, polyacrylate salts, polymethacrylate salts, polyvinyl alcohols, hydroxy propylcellulose, hydroxyethylcellulose, polyvinyl-pyrrolidinone, polyvinylether, starch, polysaccharides, and the like. Polymeric additives may be present in inks in amounts of from 0 to about 5 percent by weight, and preferably from about 0.01 to about 2.5 percent by weight.

The water phase may make up about 50 to about 99% by weight, preferably about 65 to about 85% by weight, of the total weight of the ink composition. The water preferably comprises deionized water of low conductivity, for example, less than 0.5 $\mu$mho/cm.

The water phase is preferably a water/stabilizer system. The water/stabilizer system may comprise additives such as surfactants and cosolvents for stabilizing the system. Such additives may include, for example, Dupanol ME (DuPont), Strodex PK90, and BASF Pluronic F-68. Such additives may be present in the water phase in amounts ranging from about 0.1 to about 5% by weight.

The water phase may comprise an ink vehicle. In a preferred embodiment, a microemulsion of wax particles, with or without colorant as described above, can be added to the ink vehicle. The ink vehicle may be a water soluble ink and may comprise a colorant. Any of a number of various ink vehicles may be employed. Generally, however, the ink vehicle contains water, more preferably deionized water, as the primary component. The ink vehicle may also contain cosolvents and/or additives which modify the properties of the ink composition such as, for example, to adjust viscosity, surface tension, drying time, etc. The cosolvent may be a water miscible organic solvent. Suitable water miscible organic solvents include ethylene glycol, propylene glycol, diethylene glycols, glycerine, dipropylene glycols, polyethylene glycols, polypropylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 75:25, more preferably from about 95:5 to about 80:20. The non-water component of the liquid vehicle generally serves as a humectant which has a boiling point higher than that of water (100° C.).

The colorant present in the ink vehicle in this preferred embodiment may be any material which permits the development of visible images on a recording medium such as paper. The colorant may include dyes, pigments and the like. The colorant is preferably an oil soluble dye. Generally, any effective dye, such as one of the direct dyes or the acid dyes, can be selected as the colorant, provided that it is compatible with the other ink components and is soluble in the ink vehicle. Examples of suitable dyes include anthraquinones, monoazo dyes, disazo dyes, phthalocyanines, aza(18)annulenes, and formazan copper complexes. Particular dyes which may be used in the ink vehicle include, for example, those discussed above.

Other optional additives which may be present in the compositions of the invention include biocides such as Dow Chemical Dowicil 150, 200, and 75, benzoate salts, sorbate salts, IcI Proxel GXL, and the like, present in an amount of from about 0.001 to about 4 percent by weight, and preferably from about 0.01 to about 2.0 percent by weight of the water phase, humectants and penetration control additives such as ethylene glycol, diethyleneglycol, N-methylpyrrolidinone, propylene glycol, hydroxyethers, ethers, amides, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight; pH controlling agents such as acids or bases, phosphate salts, carboxylate salts, sulfite salts, amine salts and the like, present in an amount of from 0 to about 1 percent by weight and preferably from about 0.01 to about 1 percent by weight, or the like.

The emulsions of the invention can be prepared by any process for preparing emulsions. Generally, the organic phase is dispersed into the water phase by any suitable mechanical means to obtain an emulsion of the organic phase in the water phase. The emulsions can be prepared in a liquid jet interaction chamber, of the general description disclosed in U.S. Pat. No. 4,533,254, which is hereby incorporated by reference. A preferred apparatus is the MICROFLUIDIZER ® emulsifier, for example the MFC-M110A, available from Microfluidics Corporation in Newtown, Mass. This device comprises a liquid jet interaction chamber block, comprising submerged nozzles providing elongated orifices arranged to eject under pressure thin sheets of a liquid system. The nozzles are arranged to effect turbulent jet interaction of the sheets along a common liquid jet interaction front and the sheets are ejected by the nozzles into a low pressure zone filled with the liquid, further creating turbulent jet interaction along a common boundary essentially defined and formed by the mixture in the low pressure zone and by the sheets ejected into the low pressure zone. It further comprises an inlet channel to deliver the liquid system under pressure to the nozzles, and a discharge channel to withdraw the liquid.

The ink compositions of the present invention preferably can be used in ink jet printing systems. It is preferred that the inks are used in an ink jet printing system which is capable of being utilized without clogging or leaking in either the type of printing system which uses thermal energy to produce a vapor bubble in an ink filled channel to expel a drop of the ink in response to an informational signal pulse, or the type of system which uses a piezoelectric transducer to produce a pressure pulse that expels droplets from a nozzle in response to an informational signal pulse. The nozzles of the ink jet printing system may be heated to facilitate jetting of the ink and prevent clogging of the nozzles, especially when using ink compositions comprising wax. In the case of thermal ink jets, the nozzles can be heated in addition to the heat required for jetting inks in such systems. Further, after the ink has been jetted onto a substrate, the substrate may be heated to fuse any wax present in the ink. The heating of the substrate helps to fix the printed image and further improves water fastness of the image. However, fusing is not necessary with all the ink compositions of the present invention. It is particularly useful with the embodiment in which wax particles are present in the ink composition.

When used in an ink jet printing system, the ink compositions of the invention should have a viscosity of about 0.5 cP to about 10 cP, more preferably from about 1 cP to about 5 cP, at 40° C. The surface tension of the ink compositions of the invention should range from about 30 dyne/cm to about 70 dyne/cm, more preferably from about 35 dyne/cm to about 60 dyne/cm.

Preferred embodiments of the above described emulsions include organic phases comprising, for example, 1) low melting waxes dyed in a molten state with oil soluble dyes; 2) oil colored by an oil soluble dye, pigment or mixture thereof; 3) oil soluble resin added to low viscosity oil which is colored by an oil soluble dye, pigment, or mixture thereof; 4) dyed or undyed wax particles emulsified in a molten condition and cooled to form a suspension without oil; and 5) liquid wax without oil or liquid wax dissolved in an oil and colored by an oil soluble dye, pigment or mixture thereof. Preferred water phases of the invention include, for example, 1) water/stabilizer systems such as water solutions containing diethylene glycol and/or surfactants; and 2) water soluble dye based inks.

The invention will be further illustrated in the following, non-limiting examples, it being understood that these examples are intended to be illustrative only and that the invention is not intended to be limited to the materials, conditions, process parameters, and the like recited herein.

EXAMPLE 1

Low melting waxes are dyed in the molten state with the following waterfast oil soluble dyes: BASF Sudan Blue 670, BASF Basacid Red and Oil Blue N (Aldrich). Subsequently, the colored waxes (10 to 20% by weight) are emulsified in water solutions which mainly contain diethyleneglycol and/or surfactants. The resulting stable particulate inks (50 to 500 nm in size) are tested on an HP Deskjet printer to give water fast images. The inks jet well in a piezoelectrically driven 4020 printer. The images can be further improved by heating the image in order to melt the wax particles which then coalesce to form a continuous film on the paper. Heating also improves the adhesion of the image thus enabling excellent fix properties. Conventional water-wax emulsion formation procedures can be used to prepare the inks. This involves the use of 2-amino-2-methyl-1-propanol, borax, triethanolamine, oleic acid or 3-methoxypropylamine. Additives such as Dupanol ME dry and Strodex PK90 are used in some formulations in order to improve the emulsion stability.

EXAMPLE 2

50g of refined Karagami wax, available from Concord Chemical Co., Inc., (melting temperature (Tm)=50° C.) is heated to 75° C. To this, 10 g of BASF Neptune Black dye is added and dissolved. The solution is then added to another solution of 5 g of BASF Pluronic F-68 polymeric stabilizer in 200 ml of Milliport processed water preheated to 75° C. An emulsion is made by processing the resulting mixture in an MFC-M110ET Microfluidizer (Microfluidics Corp.) at 75° C. for 30 minutes at an external, dynamic pressure of 80 psi. The emulsion is collected and allowed to cool to room temperature while stirring on a magnetic stirring plate. When cool, the emulsion is centrifuged at 5000 rpm for 10 minutes to remove any unstable portion of the emulsion. Ethylene glycol is added in one part to ten, and 0.4% by weight of DuPont Dupanol ME is added. When an attempt is made to print the ink on an HP Deskjet printer, no images are obtained. It is found that the print head had become irreversibly plugged. This problem is overcome by keeping the printhead heated.

EXAMPLE 3

5 g of Karagami wax available from Concord Chemical Co., Inc., is plasticized with 45 g of refined linseed oil. The wax does not dissolve in the oil. To this, 10 g of Neptune Black dye is added. The resulting mixture is heated up to 75° C. and made into an ink as in Example 2. When the sample is printed on plain paper with an HP Deskjet, two very good prints are obtained. Subsequent prints become progressively worse until the print head becomes irreversibly plugged. Heating at the head may avoid this problem. It is expected that using a printing head kept at a temperature higher than the melting point of the wax will significantly improve the printing performance. The prints which were obtained showed excellent water-fastness with no brailing usually characteristic of most wax ink jet inks.

EXAMPLE 4

5 g of Eastman Kodak CP 343-1 chlorinated polyolefin and 10 g of BASF Neptune Black dye are dissolved into 45 g of Magiesol 60. The oil solution is then added to a solution of 5 g of BASF Pluronic F-68 polymeric stabilizer and 200 ml of Millipore processed water. An emulsion is then made by processing the resulting mixture with an MFC-M110A Microfluidizer (Microfluidics Corp.) for 15 minutes at an external, dynamic pressure of 80 psi. The emulsion is collected and centrifuged at 5000 rpm for 10 minutes to remove any undissolved dye or dye filler. Ethylene glycol is added in one part to ten, and 0.4% by weight of DuPont Dupanol ME is added. The working ink is then shaken on a hand shaker for 30 seconds to ensure complete dispersion. The sample, when printed on plain paper with an HP Deskjet printer, produces good images. When compared to prints of a similar oil emulsion based ink with no resin added, the sample prints had darker and sharper images, as well as much better water fastness.

EXAMPLE 5

12.5 g of Eastman Kodak CP 343-1 and 10 g of Neptune Black dye are dissolved into 37.5 g of Magiesol 60. The oil solution is then added to the same aqueous stabilizer system as in Example 4. The resulting mixture is processed and made into an ink as before. This sample, when printed, produces images of acceptable quality which have good water fastness and very little show through.

EXAMPLE 6

25 g of Eastman Kodak CP 343-1 and 10 g of Neptune Black dye are dissolved into 25g of Magiesol 60. The material is processed as in Examples 4 and 5 except that the operating temperature is increased to 90° C. from 25° C. The sample can not be made into an ink because the emulsion "sets up" upon cooling.

EXAMPLE 7

5 g of Eastman Kodak CP 343-1 and 10 g of Raven 5250 carbon black is mixed into 45 g of Magiesol 60. The resulting mixture is processed and made into an ink as in Example 4. When printed, acceptable images are produced which have good water fastness and rub resistance, as well as very little show through.

EXAMPLE 8

10 g of BASF Sudan Blue dye is dissolved into 50 g of epoxidized linseed oil. The oil solution is then added to a solution of 5 g of BASF Pluronic F-68 polymeric stabilizer and 200 ml of Millipore processed water. An emulsion is made by processing the resulting mixture in an MFC-M110A Microfluidizer (Microfluidics Corp.) for 15 minutes at an external, dynamic pressure of 80 psi. The emulsion is collected and centrifuged at 5000 rpm for 10 minutes to remove any undissolved dye or dye filler. Ethylene glycol is added in one part to ten, and 0.4% by weight of Dupont Dupanol ME is added. The working ink is then shaken on a hand shaker for 30 seconds to ensure complete mixing. The sample, when printed on plain paper with an HP Deskjet printer, produces good images over a number of prints. These prints are found to have excellent water fastness and very acceptable show through.

EXAMPLE 9

10 g of BASF Neptune Black dye is dissolved into 50 g of refined linseed oil. The oil solution is then added to a solution of Pluronic F-68 and 200 ml of Millipore water. The resulting mixture is processed and made into a working ink as in Example 8. When printed on plain paper, the images are found to be only fair due to the amount of feathering and show through.

EXAMPLE 10

10 g of Neptune Black dye is dissolved into 50 g of Magiesol 60. The oil solution is then added to the same aqueous stabilizer system as in Example 8. The resulting mixture is processed and made into an ink as in Example 8. When printed on plain paper, the sample produces good images. However, these prints show slightly less water fastness than the previous two examples.

EXAMPLE 11

10 g of American Hoechst PV Fast Blue pigment is mixed into 50 g of epoxidized linseed oil. The mixture is then processed and made into an ink as in Example 8. When printed on an HP Deskjet printer, this sample produces excellent images with extremely good water fastness and rub resistance. The prints also display very little show through.

EXAMPLE 12

10 g of Paul Uhlich 8200 carbon black is mixed with 50 g of refined linseed oil. The resulting mixture is processed and made into an ink as in Example 8. When printed on the HP Deskjet printer, the sample produces very good images with extremely good water fastness and rub resistance. Surprisingly, these prints also show very little show through.

EXAMPLE 13

5 g of Sudan Blue dye and 5 g of American Hoechst Novaperm yellow pigment are mixed into 50 g of refined linseed oil. An ink is made of the resulting mixture as in Example 8. When printed, the sample produces quite good images with excellent water fastness and rub resistance. These prints also show very little show through.

EXAMPLE 14

A Concord Premium Wax SE microemulsion (average particle size: 168 nm) (self emulsifying) is added (1.0% by weight of wax) to a dye-based cyan ink and jetted with success on an HP thermal ink jet printer. Fusing of the wax particles by heating then forms a film on the paper surface which excludes water from the dye, thus enhancing waterfastness of the image. If dyed particles are used with the dyed solution, then an increase in waterfastness is observed without fusing. At high concentration of wax emulsion, the jetting characteristics of the ink become unacceptable for the HP printer, but the ink still performs well in piezoelectrically driven ink jet printers.

EXAMPLE 15

10 g of BASF Neptune Black dye is dissolved into 50 g of Diamond Shamrock Chlorowax 40 liquid chlorinated paraffin. The colored liquid wax is then added to a solution of 5 g of BASF Pluronic F-68 polymeric stabilizer and 200 ml of Millipore processed water. An emulsion is made by processing the mixture in an MFC-M110A Microfluidizer (Microfluidics Corp.) for 15 minutes at an external, dynamic pressure of 80 psi. The emulsion is then collected and centrifuged at 5000 rpm for 10 minutes to remove any undissolved dye or dye filler. Ethylene glycol is added (15% by weight), and 0.4% by weight of DuPont Dupanol ME is added. The working ink is then shaken on a hand shaker for 30 seconds to ensure complete mixing. The sample, when printed on plain paper with an HP Deskjet printer, produces acceptable images which show excellent water fastness and very little show through.

EXAMPLE 16

25 g of Diamond Shamrock Chlorowax 40 is dissolved into 25 g of refined linseed oil. To this is added 10 g of Raven 5250 carbon black. The resulting mixture is made into an ink as in the previous examples. When printed on plain paper, the sample produces very good images which show excellent water fastness, very good rub resistance, as well as little show through. From Examples 15 and 16 it is evident that fairly high viscosity waxes can be used as the vehicle for the colorant in ink jet inks that give good water fastness properties with little show through.

While the invention has been described with reference to particular preferred embodiments, the invention is not limited to the specific examples given, and other embodiments and modifications can be made by those skilled in the art without departing from the spirit and scope of the invention.

What is claimed is;

1. An ink jet printing process for an ink jet printing system which supplies an informational signal pulse, comprising the steps of providing an ink composition comprising a suspension of wax particles having a melting temperature less than about 150° C., and having an average particle diameter of about 0.01 micrometer to about 2 micrometers in a water phase and a colorant, said water phase present in an amount 50 to 99% by weight and jetting said ink composition onto a substrate in response to said informational signal pulse.

2. The process of claim 1, wherein said wax particles include a plasticizer.

3. The process of claim 1, wherein said water phase comprises a dye based ink vehicle.

4. The process of claim 1, wherein said wax is colored with at least one of pigment and dye.

5. The process of claim 1, wherein said wax is substantially free of colorant.

6. The process of claim 1, wherein said wax has a melting temperature less than about 100° C.

7. The process of claim 1, wherein said wax particles are present in an amount from 0.5 to 50% by weight.

8. The process of claim 1, wherein said wax particles are present in an amount from 1 to 20% by weight.

9. The process of claim 1, wherein said water phase is present in an amount for 65 to 85% by weight.

10. An ink jet printing process for an ink jet printing system which supplies an informational signal pulse, comprising the steps of providing an ink composition comprising wax particles having a melting temperature less than about 150° C. and a diameter ranging from about 0.01 micron to about 2 microns, a water phase in an amount 50 to 99% by weight and a colorant and jetting said ink composition onto a substrate in response to an informational signal pulse.

11. The process of claim 10, wherein said wax particles include a plasticizer.

12. The process of claim 10, wherein said wax has a melting temperature less than about 100°.

13. The process of claim 10, wherein said wax particles are present in an amount from 0.05 to 50% by weight.

14. The process of claim 10, wherein said wax particles are present in an amount from 1 to 20% by weight.

15. The process of claim 10, wherein said water phase is present in an amount from 65 to 85% by weight.

16. The process of claim 10, wherein the step of jetting an ink composition comprises providing a vapor bubble in an ink filled channel to expel droplets from a nozzle.

17. The process of claim 10, wherein the step of jetting an ink composition comprises producing a pressure pulse to expel droplets from a nozzle.

18. The process of claim 10, additionally comprising heating said ink composition to fuse said wax particles.

* * * * *